United States Patent [19]

Marrington

[11] 4,153,187
[45] May 8, 1979

[54] METERING DISPENSER FOR LIQUIDS

[75] Inventor: Jack D. Marrington, Capalaba, Australia

[73] Assignee: J. D. Engineering Services Pty. Ltd., Australia

[21] Appl. No.: 685,922

[22] Filed: May 12, 1976

[30] Foreign Application Priority Data

May 16, 1975 [AU] Australia ............................. PC1636
Oct. 30, 1975 [AU] Australia ............................. PC3780
Feb. 13, 1976 [AU] Australia ............................. PC4847

[51] Int. Cl.² .................... G01F 11/32; G01F 11/44
[52] U.S. Cl. .................................. 222/440; 222/444; 222/452; 222/453; 222/504
[58] Field of Search ............... 222/440, 444, 504, 452, 222/453

[56] References Cited

U.S. PATENT DOCUMENTS

| | | | |
|---|---|---|---|
| 820,556 | 5/1906 | Cooke | 222/444 X |
| 1,733,310 | 10/1929 | Manley | 222/440 |
| 2,761,595 | 9/1956 | Vergers | 222/444 X |
| 2,838,208 | 6/1958 | Levit | 222/440 X |
| 3,189,233 | 6/1965 | Wilson et al. | 222/440 |

Primary Examiner—Allen N. Knowles
Assistant Examiner—Frederick R. Handren

[57] ABSTRACT

A liquid dispenser having a metering chamber and a supply chamber disposed in side by side relationship and adapted for liquid communication with one another through a normally open supply valve. The liquid in the chambers are maintained at the same level. An outlet drain from the metering chamber through which liquid may be drained from the metering chamber and a normally closed outlet valve for controlling the flow of liquid through the outlet drain is provided. The supply valve and said outlet valve co-operate in such manner that upon opening the outlet valve to dispense liquid from the metering chamber, the supply valve closes and then subsequently re-opens for replenishing the metering chamber from the supply chamber only after the outlet valve has closed.

7 Claims, 3 Drawing Figures

METERING DISPENSER FOR LIQUIDS

This invention relates to a liquid dispenser. In its simplest form, it comprises a liquid dispenser of the type which is adapted to co-operate with an inverted open topped container to dispense, upon actuation, a predetermined quantity of liquid from said inverted container.

There have been provided in the past many spirit dispensers for dispensing a predetermined quantity of spirit from a reservoir, for example a bottle. The dispensers that have been available for dispensing from a supported inverted bottle or other remote source utilise valve means or spring diaphragms to regulate the quantity of fluid dispensed. Accordingly, many of the presently available types of dispensers dispense amounts of spirit which may vary over a wide range.

It is an object of this invention to provide a liquid dispenser which will overcome the disadvantages of the presently available dispensers. In its simplest form, the present invention utilizes gravitational operation and simple construction in order to achieve consistent operation. Other objects and advantages of the invention will become apparent from the following description.

With the foregoing and other objects in view, this invention resides broadly in a liquid dispenser having a metering chamber and a supply chamber disposed in side by side relationship and adapted for liquid communication with one another through normally open supply valve means whereby the liquid in said chambers may be maintained at the same level; an outlet drain from said metering chamber through which liquid may be drained from said metering chamber and normally closed outlet valve means for controlling the flow of liquid through said outlet drain, and said supply valve means and said outlet valve means being adapted to co-operate in such manner that upon opening said outlet valve means to dispense liquid from said metering chamber, said supply valve means closes and then subsequently re-opens for replenishing said metering chamber from said supply chamber only after said outlet valve means has closed.

In order that the invention may be more readily understood and put into practical effect, reference will now be made to the accompanying drawings which illustrate the preferred embodiments of the invention, and wherein.

Figure 1:
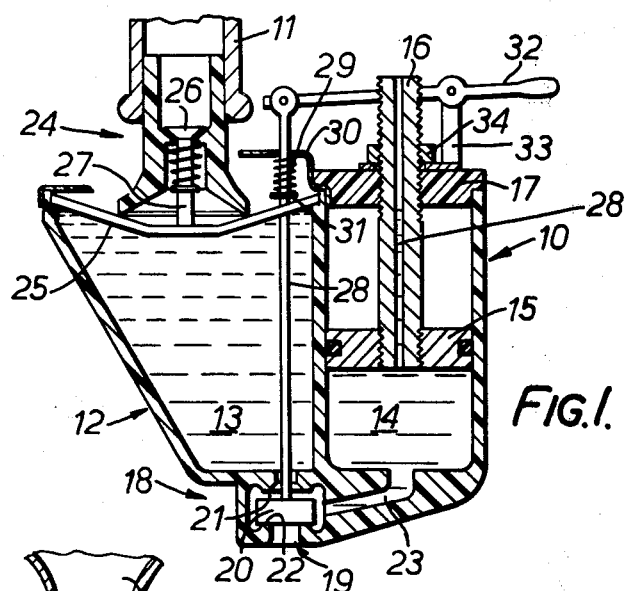
FIG. 1 illustrates a manually operable spirit dispenser made in accordance with the present invention.

As illustrated in FIG. 1, the manually controlled dispenser 10 is adapted for dispensing a selected quantity of spirit from an inverted bottle 11, only the lowermost portion of which is shown, and the dispenser 10 comprises a body portion 12 moulded of clear plastic material and including a supply chamber 13 and a metering chamber 14. A reciprocable piston 15 is sealably slidable in the metering chamber 14 and is adjustably mounted so that the volume of the metering chamber 14 therebelow may be selectively varied. For this purpose, the piston 15 is supported by a hollow piston rod 16 which passes threadedly through a top cap 17 which is fixed into the open upper end of the metering chamber 14. The passage through the hollow rod 16 communicates with the underside of the piston 15. Thus, the piston rod 16 performs the dual functions of supporting the piston 15 at a selected position within the chamber and of providing an air bleed to the metering chamber 14.

The metering chamber 14 is adapted to be replenished from the supply chamber 13 through the manually operable two-way valve means 18 provided to control the flow of fluid between the chambers 13 and 14, and through the outlet 19. In this embodiment, the manually operable valve means comprises a single movable valve member 20 reciprocable between opposed upper and lower valve seats 21 and 22 so that in use, when one valve seat is sealed by the member 20 the other is open. The support shaft 28 for the valve member 20 is urged downwardly by the spring 29 fitted between the top cap 30 and the circlip 31 so that the outlet 19 is normally closed. The support shaft 28 may be moved upwards by downward movement of the outer end of the trigger shaft 32 connected pivotally to the upper end of the shaft 28 and supported pivotally on a bracket 33 retained beneath the top lock nut 34 for the piston rod 16.

Thus, if the valve member 20 is moved upwards to engage the upper valve seat 21, the valve member 20 will clear the lower valve seat 22 so that spirit will flow from the metering chamber 14 through the outlet 19. After emptying the metering chamber 14, if the trigger 32 is released, the valve member 20 is moved downwards by the spring 29 to engage the lower valve seat 22 to close the outlet 19. Simultaneously, the valve member 20 is moved from the upper valve seat 21 so that the chambers 13 and 14 are again placed in fluid communication through the passageway 23. Thus, the emptied metering chamber 14 will fill from the supply chamber 13 until the level of both chambers is the same.

It will be seen from the drawings that the open metering chamber 14 comprises a lower bulbous portion, beneath the piston 15, and an upper small diameter portion formed by the air bleed passage in the piston rod 16. With this arrangement, any variation in the level of the liquid in the metering chamber will be a variation in the level within the very small diameter air bleed passage 28 and will result in only a very small percentage variation in the volume of liquid contained in the metering chamber 14.

In this embodiment, the level of the liquid in the supply chamber 13, is maintained by supporting the bottle 11 with its lowermost opening positioned at the desired liquid level and on a grate-type cradle 25. When the liquid level in the supply chamber 13 drops, spirit will flow into the supply chamber 13 until it contacts the open neck portion of the bottle.

To facilitate inversion of the bottle for insertion into the supply chamber 13, there is provided a safety valve assembly 24 in the neck of the bottle 11 adapted to prevent spillage during inversion of the bottle prior to its engagement with the support cradle 25 at the upper end of the chamber 13. This safety valve assembly has a valve member 26 co-operating with a spring urged stem 27 to maintain the valve closed until the bottle is moved vertically downwards to its final supported position on the cradle 25. Upon this action, the stem 27 co-acts with the cradle 25 and moves upwards relative to the bottle 11 to open the valve assembly 24.

Figure 2:
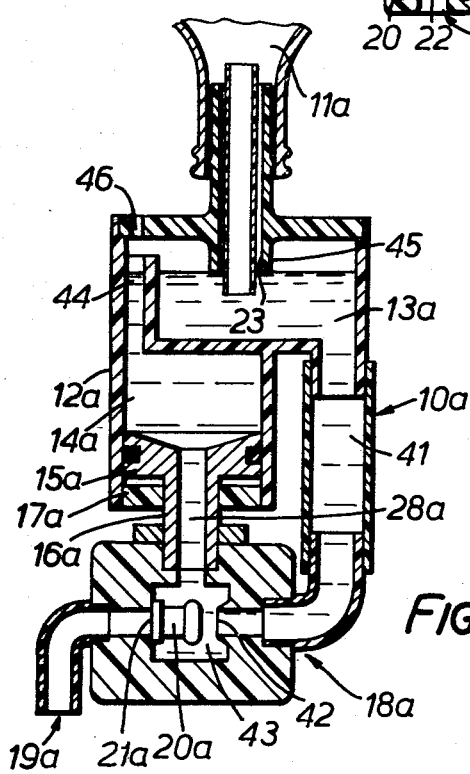
FIG. 2 illustrates an electrically operated embodiment.
Figure 3:
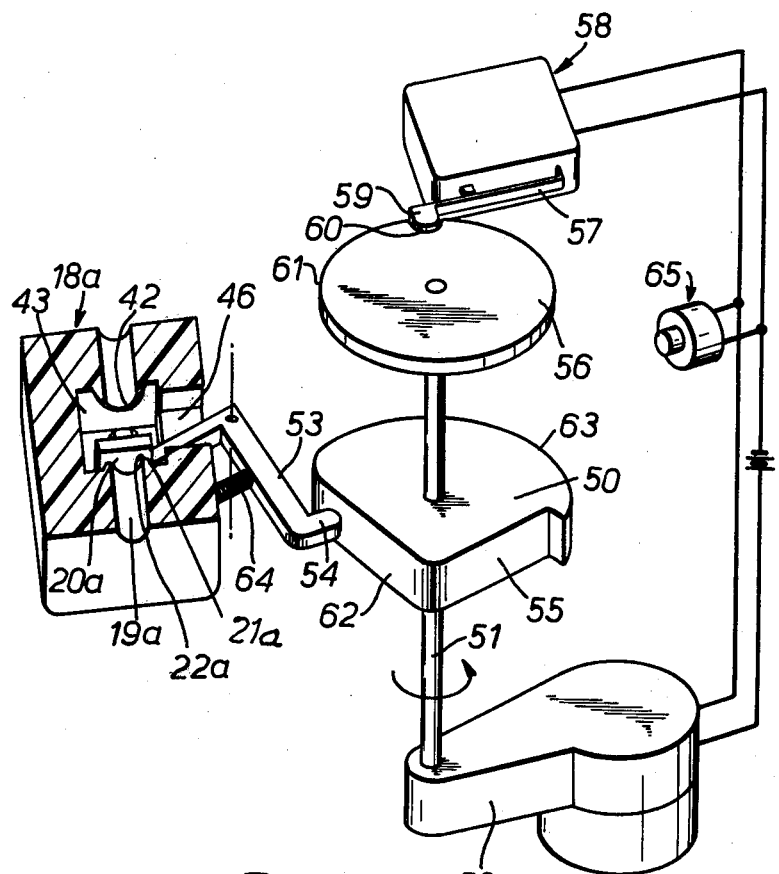
FIG. 3 illustrates diagrammatically the liquid valve and electric control apparatus for the embodiment illustration in FIG. 2.

For comparison purposes, parts of the embodiment illustrated in FIGS. 2 and 3 corresponding with parts of the just described embodiment are denoted with the same numeral suffixed by the letter "a".

This dispenser 10a differs from the dispenser 10 mainly in that the metering chamber 14a is formed above the piston 15a and the passage 28a in the piston rod forms the dispensing outlet from the metering chamber 14a. Also the valve means 18a operable to place the chambers 14a and 13a and the outlet 19a in the desired communication is a separate fitting and is electrically controlled.

The metering chamber 14a is replenished from the supply chamber 13a through the valve means 18a which in this embodiment is a flap valve 20a biased for closure of the outlet passage 19a but normally permitting communication between the drain passage 28a and the passage 41 communicating with the metering chamber 14a and the supply chamber 13a respectively. When the flap valve member 20a is pivoted to close the passage 41 at the seat 42 the spirit in the metering chamber 14a will flow through the drain passage 28a, the interior 43b of the valve 18a to and through the outlet 19a. After the metering chamber 14a has been emptied the valve member 20a is actuated to return to its normal position across the outlet valve seat 21a, as illustrated, so that the emptied metering chamber 14a will re-fill from the supply chamber 13a until the level of both chambers is the same. The chamber 14a is provided with an upper small diameter level passage 44 for achieving consistently accurate results as previously described. Furthermore the liquid level is fixed at the lower end of the inlet stem 45 so that the only variable is the position of the piston 15a. As in the embodiment of FIG. 1, the level of the liquid in the supply chamber 13a is maintained with the effective opening of the bottle 11a (i.e., the opening of passage 23) positioned at the desired liquid level. This may be varied by utilizing a form fit sleeve 23a within the passage, as seen in FIG. 2.

As shown in FIG. 3, the two-way flap valve 20a is arranged for actuation by a cam 50 connected to the output shaft 51 of a synchronous motor and gearbox assembly 52. The flap valve member 20a is connected operatively to a valve pivot lever 53 which is disposed with its cam-contacting abutment 54 in operative relationship relative to the cam face 55 of the cam 50. The valve member 20a is contained sealably within a flexible shroud (not shown) which passes into the chamber 43b and which seals around the opening 46 through which the valve lever 53 passes. The output shaft 51 also supports a notched cam 56 which co-operates with the switch lever 57 of a limit switch assembly 58 such that when the abutment 59 of the switch lever 57 is located within the notch 60 of the cam 56, the contacts of the switch are placed in open-circuit, but are closed when the cam 56 is rotated causing the abutment 59 to move outwards and bear against the outer periphery 61 of the cam 56.

When the abutment 54 of the valve lever 53 bears against the cut-away face 62 of the cam member 50, the flap valve member 20a is held sealably against the outlet seat 21a (which is shown diagrammatically in half-section in the drawings). As the cam 50 is rotated, the abutment 54 is moved to engage the part-circular portion 63 of the cam face 55, in which position the valve lever 53 is positioned to maintain the flap member 20a sealably against the seat 42. In this position, spirit may flow from the dispenser 10a through the outlet 19a.

The valve lever 53 is provided with spring means 64 adapted to urge the flap for sealing engagement with the seat 21a. There is also provided an actuating press button assembly 65 to actuate the device, the electrical connection between the press button assembly, electric motor, power supply and micro-switch being shown.

In operation, when the button 65 is pressed, the motor and gearbox assembly is activated and the output shaft 51 rotates. Upon initial rotation the abutment 59 of the micro-switch is moved to contact the outer periphery of the cam 56, whereupon the contacts of the microswitch are maintained closed so that the motor will continue to operate until the abutment 59 falls back into the notch 60 at the end of one revolution of the cam 56. Simultaneously, the valve lever 53 is pivoted from its normal inoperative position, as shown, to urge the flap member 20a sealably against the valve seat 42. In this position, spirits can flow through the outlet passage 19a. The flap 20a is maintained in this position long enough to dispense the contents of the metering chamber by correct selection of the arc of the part-circular cam surface 63. Prior to completion of the cycle, coinciding with one revolution of the output shaft 51 as set out above, the cam engages the cut-away portion 62 of the abutment 54 of lever 53 surface 55 to enable the spring 44 to urge the flap member 20a back into engagement with the outlet valve seat 21a. It will thus be seen that the device is of simple construction and that actuation is entirely mechanical. However various other control arrangements could be used advantageously. Of course there is provided an air bleed 46 so that the liquid levels will be maintained at the same level.

Furthermore the dispenser could be produced to dispense one selected volume only, whence the inclusion of the piston 15a, would not be essential. However, it may be then desirable to provide fine adjustment by adjustably mounting the outlet stem 45 for providing adjustment of the liquid level in the supply chamber 13a.

Also, while in the preferred embodiments only one movable valve member provides a dual function, it will be understood that separate valves could be provided for controlling the flow of fluid of liquid between the supply chamber and the metering chamber and for controlling the flow of fluid from the metering chamber through the outlet. Many other means which are commonly employed may be provided to maintain the level of liquid in the supply chamber at the preselected level, even if the liquid source is remote from the dispenser. Also the metering chamber and the supply chamber may, if desired, be supported remotely from one another.

While the above has been given by way of example illustrative of the broad concept of the invention, it will of course be realised that many other modifications of constructional detail and design may be made to the above described embodiment by persons skilled in the art without departing from the broad scope and ambit of the invention as is defined by the appended claims.

I claim:

1. A liquid dispenser comprising a metering chamber and a piston assembly selectively movable therein to vary the volume of said chamber, a supply chamber adapted for liquid communication with said metering chamber, normally open liquid supply valve means positioned intermediate said metering and supply chambers whereby the liquid in said chambers may be maintained at the same level, an outlet drain connected to said metering chamber through which liquid may be drained from said metering chamber, said supply chamber being adapted to cooperate with an inverted bottle such that the level of liquid within said supply chamber is at the lower open end of said bottle, a hollow piston rod connected to said piston assembly providing a flow passage therefrom communicating with the interior of said metering chamber and comprising said outlet drain, normally closed outlet valve means for controlling the flow of liquid through said outlet drain, and control means interconnecting said liquid supply valve means and said outlet valve means for cyclic operation wherein said liquid supply valve is closed and said outlet valve means is opened to dispense the liquid from said metering chamber, and subsequent thereto to close said outlet supply valve and reopen said liquid supply valve for replenishing said metering chamber with liquid from said supply chamber.

2. A liquid dispenser according to claim 1, wherein said metering chamber is constituted by a lower voluminous part which contains substantially all the liquid in said metering chamber and an upper part having a relatively small cross-sectional area, whereby variations of the level of liquid in said upper part will result in only small percentage variations in volume of said metering chamber.

3. A liquid dispenser according to claim 1, wherein said piston rod extends downwards from said piston and constitutes said outlet drain.

4. A liquid dispenser according to claim 1, including a valve assembly having three ports communicating with a common valve chamber connected between said metering chamber and said supply chamber, said ports comprising a first port constituting selectively an inlet or outlet to or from said metering chamber, a second port operatively connected to said supply chamber and a third port operatively connected to said outlet drain, and a valve member reciprocable within said valve chamber for sealable engagement with a respective one of said second and third ports.

5. A liquid dispenser according to claim 4, including spring means for urging said valve member for closure of said third port and electrically operated actuating means operatively connected to said valve member adapted, upon actuating, to move said valve member from said third port and into sealable engagement with said second port for a period of time sufficient to drain the contents of said metering chamber through said outlet drain.

6. A liquid dispenser according to claim 4, wherein said metering chamber and said supply chamber are formed as a one piece moulding.

7. A liquid dispenser according to claim 4, wherein the liquid level within said supply chamber is variable by varying the vertical position of the outlet from said bottle.

* * * * *